United States Patent

[11] 3,617,763

[72] Inventor Edward L. Laskowski
Parma, Ohio

[21] Appl. No. 67,889
[22] Filed Aug. 28, 1970
[45] Patented Nov. 2, 1971
[73] Assignee General Electric Company

[54] DELAY LINE CIRCUIT FOR SEQUENTIALLY FLASHING PHOTOFLASH LAMPS
11 Claims, 7 Drawing Figs.

[52] U.S. Cl. .......... 307/41, 95/11.5, 431/95, 315/323
[51] Int. Cl. .......... H02j 3/14
[50] Field of Search .......... 315/37, 38, 323, 241, 242; 95/11.5, 11 L; 431/95; 340/223; 307/141, 141.4, 141.8, 38, 39, 40, 41

[56] References Cited

UNITED STATES PATENTS

| | | | |
|---|---|---|---|
| 3,099,962 | 8/1963 | Smith .......... | 307/41 X |
| 3,518,487 | 6/1970 | Tanaka et al. .......... | 95/11.5 X |
| 3,532,931 | 10/1970 | Cote et al. .......... | 315/323 X |

*Primary Examiner*—Herman J. Hohauser
*Attorneys*—Norman C. Fulmer, Henry P. Truesdell, Frank L. Neuhauser, Oscar B. Waddell and Joseph B. Forman

ABSTRACT: A delay line circuit for causing sequential flashing of photoflash lamps from firing pulses of electrical energy. Delay line segments are successively connected in series between the individual photoflash lamps. A light detector and pulse control circuitry insures flashing of a single lamp per firing pulse, and an exposure control modification thereof insures flashing of one or more lamps per firing pulse as needed for correct exposure.

Inventor:
Edward L. Laskowski
by Norman C. Fulmer
His Attorney

Inventor:
Edward L. Laskowski
by Norman C. Fulmer
His Attorney

DELAY LINE CIRCUIT FOR SEQUENTIALLY FLASHING PHOTOFLASH LAMPS

BACKGROUND OF THE INVENTION

The invention is in the field of etc., circuitry for sequentially flashing photoflashlamps, and is particularly etc., with a unitary array of flashlamps, such as three or four or more lamps arranged to radiate their light in the same direction when they are sequentially flashed, so that the array need not be moved nor removed until all of its lamps have been flashed.

Numerous circuits have been devised for successively flashing photoflashlamps by pulses of electrical energy such as are obtained from a battery through a momentarily closed switch or from a capacitor which has been charged through a resistor from a battery, or from some other suitable energy source. Such a pulse of electrical energy usually is initiated by closure of a switch associated with the shutter mechanism of a camera. A type of circuit heretofore proposed employs mechanically actuated switches for applying the electrical pulses to successively different flashbulbs; another type of circuit utilizes heat-responsive or light-responsive means associated with the flashlamps and adapted to actuate switching means for connecting the pulse source to successively different flashlamps as each lamp becomes flashed; and a further type of circuit utilizes transistors or thyristors for automatically connecting the pulse source to successively different flashlamps as each lamp becomes flashed.

Another previously proposed circuit employs resistors successively connected in series with a plurality of individual flashlamps, so that the lamps are connected in electrical parallel through the resistors. The firing pulse source is connected to an end of the circuit, whereby each flashlamp is connected across the pulse source through successively greater resistance. The circuit operates on the principles of voltage division. The first pulse flashes the nearest lamp, which becomes an open circuit upon flashing, whereupon the next pulse flashes the next lamp, etc. In order to insure flashing of only one flashlamp (the nearest unflashed lamp to the pulse source) per firing pulse, it is desirable that the series resistors have relatively large values of resistance as compared to the resistances of the flashlamp filaments. However, large values of series resistance undesirably consume considerable energy from the firing pulses.

SUMMARY OF THE Invention

Objects of the invention are to provide a new and improved circuit for sequentially flashing flashbulbs; to provide such a circuit which is free from the above-described disadvantages of resistance circuits; and to provide such a circuit that is low in cost and highly reliable in operation.

The invention comprises, briefly and in a preferred embodiment, a plurality of photoflashlamps adapted to be sequentially flashed by a sequential series of firing voltage pulses, and delay line segments successively connected in series between the lamps, so that the lamps are connected in electrical parallel through the delay line segments. The firing voltage pulse source is connected across an end of the circuit. Preferably an additional delay line segment is connected between the circuit and the source of firing pulses. The invention further comprises, in combination with the foregoing, a pulse control circuit for initiating the firing pulse and for terminating the firing pulse in response to the flashing of a lamp. An exposure control modification comprises a light detector connected with the pulse control circuit so as to cause flashing of one or more lamps from a firing pulse as needed for correct exposure.

BRIEF DESCRIPTION OF THE DRAWINGS

!

DESCRIPTION OF THE PREFERRED EMBODIMENT

Figure 1:
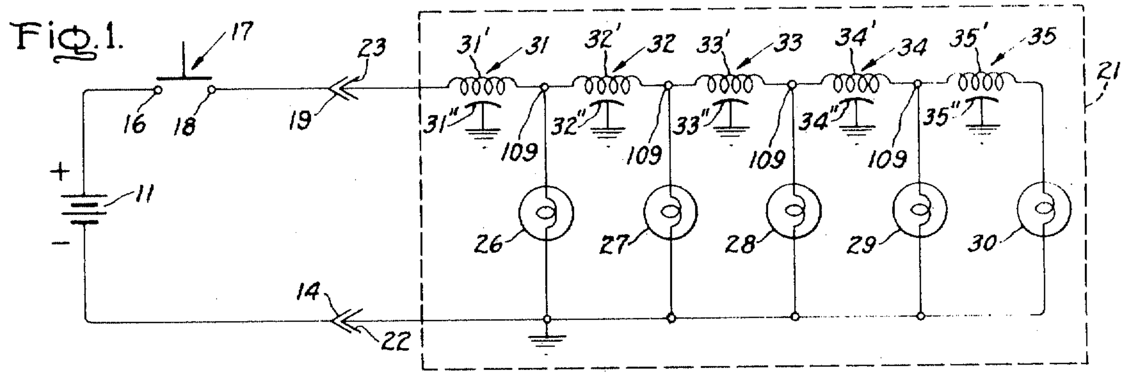
FIG. 1 is an electrical schematic diagram of a preferred embodiment of the invention.

In the circuit of FIG. 1, a battery 11 has one terminal thereof connected to a connector plug terminal 14, and the other electrode thereof is connected to a terminal 16 of a switch 17, the other terminal 18 thereof being connected to a second connector plug terminal 19. The switch 17 is adapted to be momentarily closed in synchronization with the opening of a camera shutter, in well-known manner. The circuitry thus far described functions as a source of electrical energy firing pulses for flashing photoflash lamps, and may be incorporated in a camera, or in a flash attachment for use with a camera. Although the firing pulse is sometimes called a "voltage" pulse, it is primarily the energy of the pulse, comprising the combination of voltage, current, and time duration, that causes a lamp to flash.

A flash lamp array unit 21 is provided with a pair of connector prongs 22 and 23 adapted for electrical engagement with the terminals 14 and 19, respectively. The unit 21 contains a plurality of photoflashlamps 26–30 which may be of conventional type, such as General Electric-type AG–1, each containing a filament provided with electrical connection lead wires and adapted for initiating a flash of combustible material contained within the bulb. One end of the filaments of each of the lamps 26–30 is connected to the connector prong 22. The other ends of the filaments of the lamps 26–30 are successively connected, through delay line sections or segments 31–35, to the connector prong 23. Thus, in effect, the lamps 26–30 are connected in a parallel combination through the delay line segments 31–35, this parallel circuit combination being adapted for connection across the source of firing pulses at the terminals 14 and 19, each successive lamp being connected to the firing pulse source through a successively greater amount of delay line.

Preferably the lamps 26–30 of the array 21 are provided with individual reflectors, and arranged to radiate the light emitted therefrom in the same direction. If desired, another combination of lamps and delay line segments may be provided in the unit 21, for radiating the light emission in the opposite direction, so that when all of the lamps at the front of the unit have been flashed, the unit may be turned around so that the rear array of lamps will then face frontwardly, for obtaining an additional number of flashes from a single unit. Other connector prongs similar to 22 and 23 can be provided for connecting the rear array of lamp circuitry to the connectors 14 and 19 when the unit is turned around so that the "rear" array of flashlamps faces frontwardly.

If desired, the flash array unit 21 may be removed from the camera or flash adapter after some of its lamps have been flashed, and reinserted at a later time for flashing the remaining lamps. After all the lamps have been flashed, the array unit 21 may be discarded.

In a preferred arrangement of the invention, the battery 11 may have a voltage of 5 volts, each of the flashlamps 26–30 has a resistance of 0.6 ohms, and each of the delay line segments 31–35 has a signal delay of 1 microsecond, and has a characteristic impedance of 1,000 ohms.

Each of the delay line segments 31, etc., is shown as comprising a series inductance 31', etc., and a shunt capacitance 31'', etc. For convenience in the drawing, these shunt capacitances and the connector 22 are shown as being electrically grounded such as to a metal base or frame of the array 21, although wires or printed-circuit connectors can be used instead. Each segment of the delay line may comprise a toroidal winding on a doughnut-shaped powdered-metal core, to provide 1 millihenry of inductance, and each of the capacitors may comprise a metal or foil material positioned adjacent the winding to provide a distributed capacitance of 1,000 picofarads. Alternatively, the inductances 31' to 35' may comprise a continuous tapped helical winding on an elongated powdered-metal core, with the capacitance comprising metal foil wrapped therearound. The first delay line segment 31 can be omitted, the first lamp 26 being connected directly across the terminals 22 and 23. However, it is preferred to include the first segment 31 because it provides a "soft start" of current through the switch 17 when the first lamp 26 is flashed, instead of a high surge, whereby the switch need not be designed for high-current surge capability.

Figure 2:
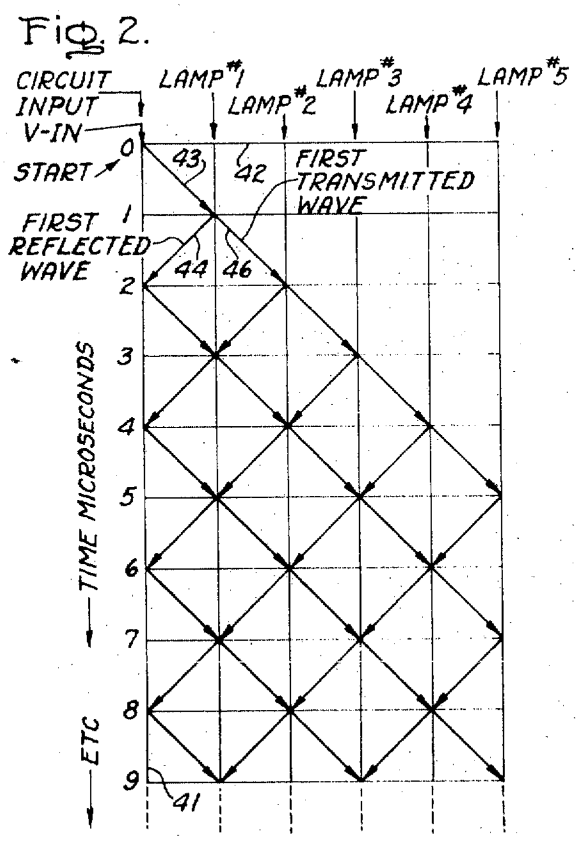
FIG. 2 is a chart of time versus firing pulse position along the delay line, illustrating how a firing pulse is transmitted and reflected numerous times in the delay line.

The circuit of FIG. 1 functions as follows. When the switch 17 is closed, in synchronization with the opening of a camera shutter, a voltage energy wave from the battery 11 flows through the first delay line segment 31. Upon reaching the first flash lamp 26, it encounters a considerable mismatch, since the resistance of lamp 26 is 0.6 ohms whereas the characteristic impedance of the delay line section 31 is 1,000 ohms. Therefore, a major portion of the pulse energy is reflected back through the delay line section 31 to the battery 11, whereupon, due to an impedance mismatch with the low resistance of the battery 11, the wave is reflected and again flows through the delay line section 31 to the lamp 26, whereupon a further reflection occurs. Each time the firing pulse wave reaches the lamp 26, the portion not reflected moves forwardly through the second delay line section 32 to the second lamp 27, whereupon there occurs a reflection and transmission of the wave similar to that which occurred at the first lamp 26. The reflection and transmission of the electrical energy occurs at each of the flashlamps, numerous times. Preferably the switch 17 is closed for a period of time up to 5,000 microseconds (5 milliseconds) whereupon the signal travels back and forth in the first delay line segment 31 some 5,000 times or less, and nearly that many times in the other delay line segments. FIG. 2 illustrates the multiple reflections and transmissions of the firing pulse wave, for the first nine microseconds.

In FIG. 2, the vertical lines 41 represent time, in microseconds, increasing in the downward direction, and the horizontal lines 42 represent distance along the delay line segments 31–35, the vertical lines crossing through the horizontal lines representing the circuit points at the connector prong 23, and at each of the successive lamps 26–30. As shown in FIG. 2, the input firing pulse energy 43 reaches the first lamp 26 at 1 microsecond, and is split into a reflected portion 44 (which contains the majority of the pulse energy) and a transmitted portion 46. The reflected wave 44, upon reaching the relatively low impedance of the battery 11 at a total elapsed time of 2 microseconds, is reflected forwardly in the circuit. The first transmitted wave 46, upon reaching the second lamp 27 at a total elapsed time of 2 microseconds, is split into a reflected wave and transmitted wave, as shown, this process of reflection and transmission of the waves at each lamp being shown in FIG. 2 for a time period of 9 microseconds, it being understood that in a preferred arrangement the total time of these reflections and transmissions may occur for up to some 5,000 microseconds or less.

The result of the aforesaid functioning of the circuit of FIG. 1, involving multiple reflections and transmissions of the firing pulse energy as shown in FIG. 2, is that the first unflashed lamp, namely the first lamp 26 for an unused array 21, receives considerably more energy than does any of the other lamps, whereupon the first lamp 26 will flash and none of the other lamps will flash, in response to the first firing pulse. Upon the occurrence of the next firing pulse, the second lamp 27 will flash, etc., until all of the lamps have been flashed. A square wave shape of firing pulse, as provided by the circuits shown in the drawing, achieves superior results to that obtained with an exponential decay shape of pulse as obtained from a capacitor discharge type of firing pulse source.

Figure 3:
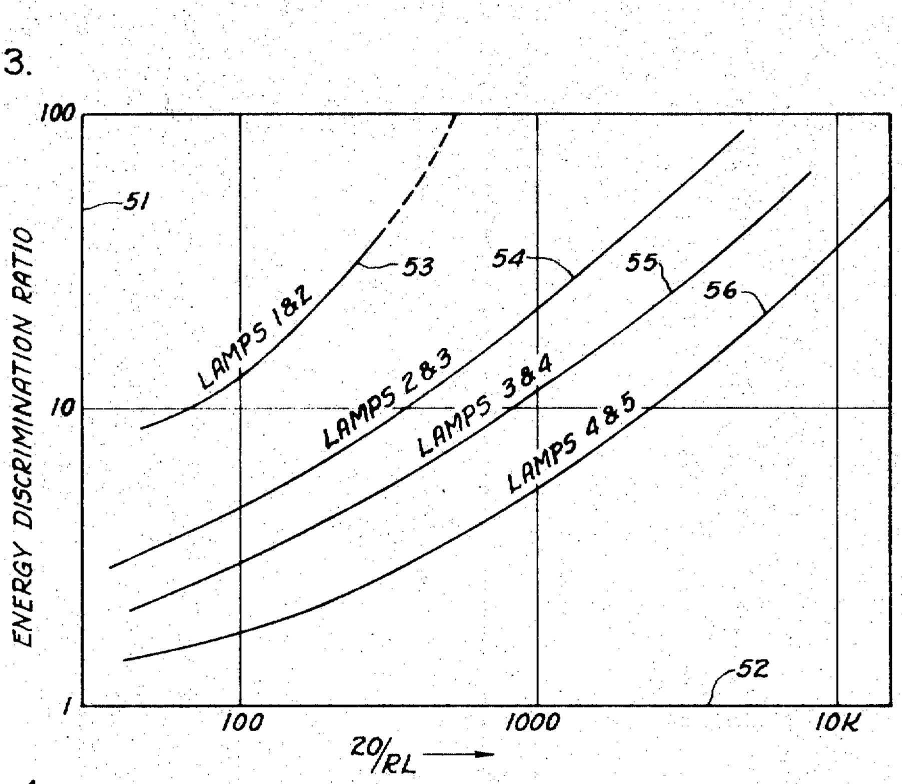
FIG. 3 is a design plot of firing energy discrimination ratio versus the ratio of delay line characteristic impedance to lamp resistance.

FIG. 3 illustrates the reliability of the first unflashed lamp, only, flashing in response to a firing pulse. In FIG. 3, the vertical axis 51 represents the energy discrimination ratio of the pulse energy applied to the nearest unflashed lamp (nearest to the battery 11) in the circuit of FIG. 1 to the greatest amount of firing pulse energy that reaches any of the remaining unflashed lamps (which in all cases is the next following lamp), and the horizontal axis 52 represents the impedance ratio of the characteristic impedance of the transmission line 31–35 ($Z_0$) to the resistance of each of the flashlamps 26–30 ($R_L$). Curve 53 represents the ratio of firing pulse energy received by the first lamp 26 to that received by the second lamp 27 when the first lamp 26 is flashed; curve 54 represents the ratio of firing pulse energy received by the second lamp 27 to that received by the third lamp 28, when the second lamp 27 is to be flashed curve 55 represents the ratio of firing pulse energy received by the third lamp 28 with respect to that received by the fourth lamp 29, when the third lamp 28 is being flashed; and the curve 56 represents the energy ratio of firing pulse energy received by the fourth lamp 29 with respect to that received by the fifth lamp 30, when the fourth lamp 29 is being flashed. Thus, each of the curves 53–56 is a ratio of firing pulses energy received by a lamp being flashed, to that received by the next lamp in the circuit, in each case this being the worst (lowest) ratio. The higher this ratio, the greater is the reliability of only the intended lamp being flashed and no other lamps flashing, per firing pulse. As shown by the curves, for a ratio of delay line characteristic impedance to lamp resistance of 1,666, which it is in a preferred arrangement, where $Z_0$=1,000 ohms and and $R_L$=0.6 ohms, when the first lamp 26 is being flashed, it receives well over one hundred times as much firing pulse energy as does the second lamp 27 (Curve 53), and the ratio is even higher with respect to the remaining lamps. When the second lamp 27 is being flashed, it receives more than thirty times as much firing pulse energy as does the third lamp 28 (Curve 54), and even a greater ratio with respect to the remaining unflashed lamps. As shown by curve 55, when the third lamp 28 is being flashed, it receives more than fifteen times as much firing pulse energy as does the fourth lamp 29, and this ratio is even higher with respect to the remaining unflashed lamp 30. Similarly, as shown by curve 56, when the fourth lamp 29 is being flashed, it receives over seven times as much firing pulse energy as does the fifth lamp 30. Thus, as shown by the curves of FIG. 3, the high circuit reliably causes only the intended lamp to flash upon each occurrence of a firing pulse. This reliability is greater, as the ratio of delay line characteristic impedance $Z_0$ to the flashlamp resistance $R_L$ is increased, and as sown in FIG. 3, if this ratio is made 10,000, the energy discrimination ratio and hence reliability of firing a single lamp per firing pulse, becomes extremely high. However, as shown in FIG. 4, increasing the ratio of $Z_0$ to $R_L$, undesirably increases the spread of time required to flash the various lamps using the 1 microsecond delay lines, and therefore, for the particular circuit embodiment shown, a ratio of $Z_0$ to $R_L$ of about 1,000 to 2,000 is preferred.

Figure 4:
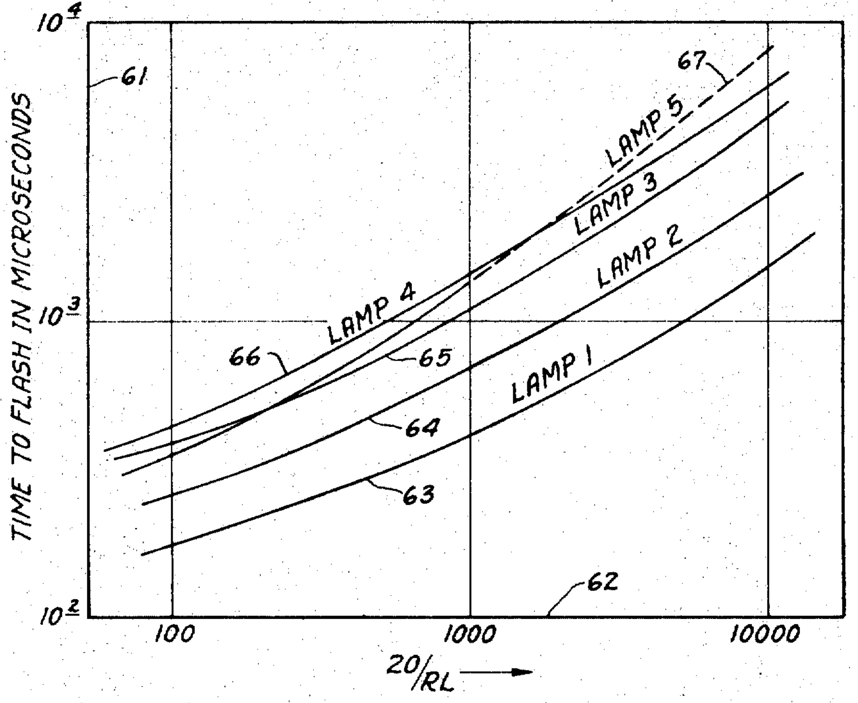
FIG. 4 is a design plot of the time required for firing various lamps in the circuit, versus the ratio of delay line characteristic impedance to the lamp resistance.

In FIG. 4, the vertical axis 61 represents the time, in microseconds, required for a lamp to flash in response to the occurrence of a firing pulse, and the horizontal axis 62 represents the ratio of $Z_0$ to $R_L$, the same as in FIG. 4. Curves 63–66 respectively represent the time required to flash each of the five lamps 26–30, for different ratios of $Z_0$ to $R_L$ when using 1 microsecond delay line sections, the dashed portion of the curve 67 for the fifth lamp 30 representing an estimated extension from the solid line portion thereof. Thus, for a $Z_0$ to $R_L$ ratio of 1666, lamp 26 flashes in about 500 microseconds after initiating the firing pulse; the second lamp 27 flashes about 900 microseconds after initiation of the second firing pulse; the third lamp 28 flashes about 1.5 millisecond after initiation of the third firing pulse; and the fourth and fifth lamps 29 and 30 respectively flash about 2.0 milliseconds after initiation of the fourth and fifth firing pulses. Thus, in the example given, the switch 17 should be be momentarily closed for a time greater than 2 milliseconds in order to be sure that each lamp will flash. However, with a pulse duration fixed at 2 milliseconds, there is some danger that when lamp 1 flashes, there will be sufficient firing pulse energy remaining to flash one or more of the remaining lamps. Therefore, it is desired to have a variable duration of firing pulses, being relatively shorter for the first lamp and longer for flashing the later lamps in the circuit.

Figure 5:
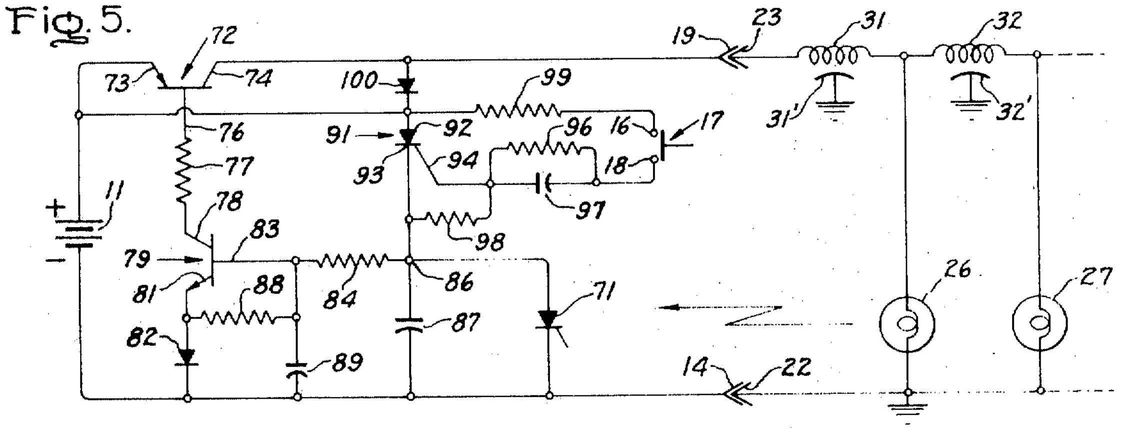
FIG. 5 is an electrical schematic diagram of an embodiment of the invention including firing pulse control circuitry, embodying a flash detector, for terminating a firing pulse upon the flashing of a lamp.

The circuit of FIG. 5 employs a light-activated silicon-controlled rectifier 71 positioned to receive light from each of the flash lamps 26–30, and it functions in conjunction with the remainder of the circuitry to terminate the firing pulse as soon as a lamp has flashed. Other light detectors such as photocells, photoresistors, or photodiodes can also be used with slight circuit modifications. The camera actuated shutter switch 17 functions, as will be described, to turn a transistor "one", which initiates the firing pulse at the contact terminals 14 and 19.

In the circuit of FIG. 5, a PNP transistor 72 has the emitter electrode 73 thereof connected to the positive terminal of the battery 11, the collector 74 connected to the connector 19, and the base 76 connected via a resistor 77 to the collector 78 of an NPN transistor 79, of which the emitter 81 is connected to the negative terminal of battery 11 via a diode 82, and a base 83 thereof is connected via a resistor 84 to a junction 86 of a capacitor 87 and the anode of light detector 71, which is shown in symbolic form as being a light-activated SCR (silicon-controlled rectifier). The remaining terminals of the capacitor 87 and the light detector 71 are connected to the negative terminal of the battery 11 (and also to the connector 14). A resistor 88 is connected between the emitter 81 and base 83 of transistor 79. A capacitor 89 is connected from base 83 of transistor 79 to the negative terminal of battery 11. An SCR 91 has the anode 92 thereof connected to the positive terminal of battery 11, the cathode 93 connected to the junction 86 of capacitor 87 and light detector 71, and a gate electrode 94 connected to the terminal 18 of shutter-actuator switch 17, via a parallel combination of a resistor 96 and capacitor 97. A resistor 98 is connected between the gate 94 and cathode 93 of SCR 91, and a resistor 99 is connected between the anode 92 of SCR 91 and the terminal 16 of the shutter-actuated switch 17. A diode 100 is connected between the collector terminal 74 of transistor 72 and the anode 92 of SCR 91.

The pulse control circuit of FIG. 5 functions as follows. The diode 82 is connected in the same polarity as the emitter 81 of transistor 79, which is shown as being of the NPN type. Initially, the transistors and SCRs in the circuit are set in the "off" or nonconducting condition. When the shutter-actuated switch 17 is momentarily closed, it connects the gate electrode 94 to the positive terminal of battery 11, via resistors 96 and 99 and capacitor 97, thus gating the SCR 91 to the "on" condition, whereupon current from the battery 11 charges the capacitor 87 to substantially the voltage of battery 11. SCR 91 will then turn off when capacitor 87 becomes fully charged. The switch 17 can now be returned to the open condition, and the capacitor 87 will retain its charge long enough to cause generation of a suitable firing pulse, as will now be described. The voltage charge on capacitor 87 is of such a polarity as to render the transistor 79 conductive by the biasing connection provided by resistor 84 between the capacitor 87 and the base 83 of transistor 79. The transistor 79, now being conductive, allows current to flow through the emitter-base junction of transistor 72, via resistor 77, to render the transistor 72 conductive between its emitter 73 and collector 74, thereby applying voltage of the battery 11 across the connector terminals 14 and 19 and hence to the photoflashlamp array 21. The firing pulse wave travels through one or more of the delay line segments 31–35, with transmissions and reflections, as has been described in connection with FIGS. 1 and 2, until the nearest unflashed lamp 26–30 becomes flashed. The light-activated SCR 71, in response to the light from the flashing lamp, becomes substantially a short circuit and discharges capacitor 87, thereby rendering transistor 79 in the "off" or nonconductive state, thereby turning off the transistor 72 and terminating the firing pulse. The circuit is now ready for the next lamp flashing in response to a momentary closing of the shutter-actuated switch 17. Thus, the pulse control circuit produces a firing pulse of time duration only sufficiently long to flash a single lamp, thereby avoiding the possibility of flashing more than one lamp per firing pulse. Current-sensing means or heat-sensing means can be used, instead of the light-sensing means, for sensing that a lamp has flashed and terminating the firing pulse.

Figure 6:
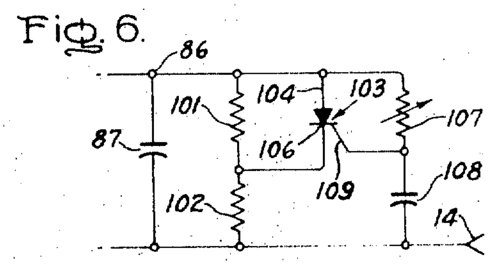
FIG. 6 is a modification of FIG. 5, embodying a light detector for causing one or more lamps to flash as needed to obtain correct exposure.

FIG. 6 shows a modification of the light-controlled circuitry connected across the capacitor 87. In this circuit modification, a pair of resistors 101 and 102 are connected in series across the capacitor 87, and an SCR 103 has its anode 104 connected to the capacitor junction 86, and its cathode 106 connected to the junction of the series resistors 101 and 102. A photoresistor 107 (or, alternatively, a photodiode) and a capacitor 108 are connected in series between the junction 86 and the connector 14, with an end of the capacitor 108 being at the connector 14 and an end of the photoresistor 107 being connected to the junction 86. The gate electrode 109 of the SCR 103 is connected to the junction of the photoresistor 107 and capacitor 108.

Figure 7:
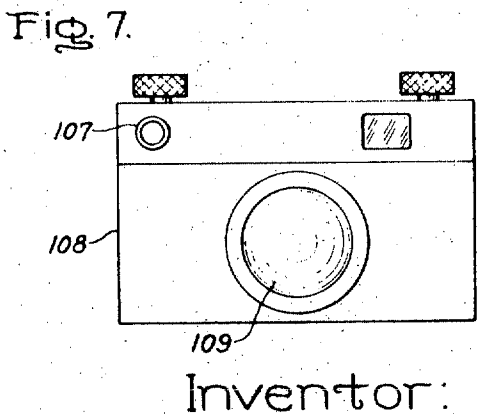
FIG. 7 is a front view of a camera embodying the light detector of the circuit of FIG. 6.

As shown in FIG. 7, the photoresistor 107 is incorporated in a camera 108 having a picture-taking lens 109, the photoresistor 107 being aimed in the same direction as the lens 109, so as to receive light from a scene to be photographed.

The circuit of FIG. 5, as modified by FIGS. 6 and 7, functions as follows. Upon a momentary closing of the shutter-actuated switch 17, the same sequence of events occurs as has been described, for initiating a firing pulse at the terminals 14 and 19. When the capacitor 87 is charged, at the beginning of the firing pulse, voltage therefrom begins to charge the capacitor 108 via the photoresistor 107, the charging rate of capacitor 108 being relatively slow due to the high resistance of the photoresistor 107. However, since the resistance of photoresistor 107 is relatively higher when the light is dim and relatively lower when the light received thereby is stronger, the capacitor 108 will charge relatively faster when the scene being photographed is relatively brightly illuminated by ambient light, in addition to light from the photoflash lamp to be flashed. If the amount of light on the scene being photographed is adequate upon flashing of a single photoflash lamp, the capacitor 108 will have become charged to a voltage sufficient to bias the gate electrode 109 of SCR 103 to the point where SCR 103 is rendered conductive. The SCR 103, upon becoming conductive, quickly discharges the capacitor 87 (via the resistor 102 which is a relatively small resistance value), thereupon terminating the firing voltage pulse in the manner as has been described above in connection with FIG. 5. If, however, upon a first flashlamp flashing, the scene being photographed has not received sufficient illumination to provide adequate picture exposure, the photoresistor 107 will not have permitted the capacitor 108 to have charged sufficiently to terminate the firing pulse, whereupon a second flash lamp will flash, and if the cumulative light upon the scene being photographed is then sufficient for suitable exposure, the capacitor 108 will have charged to a value to cause SCR 103 to become conductive, thereby terminating the firing pulse as has been described. The foregoing procedure can be repeated to fire several flashlamps, if necessary, while the shutter is open for taking a picture, to provide adequate illumination for achieving correct exposure of the film in the camera.

The circuitry of the invention can be incorporated into a camera or flash adapter instead of in a disposable flash array, with the requisite number of electrical connectors being provided for connecting the filament lead wires of the lamps 26, etc., of the array respectively to the different connection terminal points 109 along the delay line sections 31–35.

While a preferred embodiment of the invention, and modifications thereof, have been shown and described, other embodiments and modifications thereof will become apparent to persons skilled in the art, and will fall within the scope of invention as defined in the following claims.

What I claim as new and desire to secure by Letters Patent of the United States is:

1. A circuit for causing a plurality of photoflashlamps to be flashed sequentially by sequential firing energy pulses synchronized with a camera shutter, each of said flashlamps being provided with a filament having a given value of resistance, said circuit comprising a plurality of pairs of connection terminal points adapted for electrical connection thereto of respective individual lamps of said plurality of flashlamps, wherein the improvement comprises a plurality of delay line segments successively connected in series between said pairs of terminal points to connect said pairs of terminal points into an electrical parallel circuit through said delay line segments, a first pair of said terminal points at one end of said circuit being adapted for connection to a source of said firing pulses, said delay line segments having a characteristic impedance different than said value of filament resistance of the flashlamps thereby providing electrical mismatch between said delay line segments and said lamps when connected in the circuit.

2. A circuit as claimed in claim 1, including an additional delay line segment connected to said first pair of terminal points so as to be interposed between said first pair of terminal points and said source of firing pulses.

3. A circuit as claimed in claim 1, in which each of said delay line segments comprises a series inductance and a shunt capacitance.

4. A circuit as claimed in claim 1, in which the ratio of said characteristic impedance of the delay line segments to said filament resistance is in a range of about 1,000 to 2,000.

5. A circuit as claimed in claim 1, including sensing means for determining the flashing of a lamp, and circuit means for terminating a firing pulse in response to the determination by said sensing means of a lamp flashing.

6. A circuit as claimed in claim 1, including a light detector for measuring light from a scene to be photographed, and firing pulse control circuitry connected with said light detector terminating a firing pulse after a sufficient number of flashlamps connected in said circuit have flashed to provide adequate illumination of said scene.

7. A circuit as claimed in claim 6, in which said firing pulse control circuitry includes a capacitor connected in series with said light detector across a voltage source so that the rate of charge of said capacitor through said light detector is a direct function of light received by said light detector from said scene, and means for terminating a firing pulse when the charge on said capacitor reaches a predetermined level.

8. A disposable unitary array of photoflashlamps including circuitry for causing said lamps to be flashed sequentially by sequential firing energy pulses, each of said lamps containing a filament of given resistance for initiating flashing of the lamp, wherein the improvement comprises a plurality of delay line segments successively connected in series between said filaments to connect said filaments into an electrical parallel circuit through said delay line segments, and means adapted for connecting the filament of a first lamp at one end of said circuit to a source of said firing pulses, said delay line segments having a characteristic impedance different than said filament resistance of the flash lamps thereby providing electrical mismatch between said delay segments and said filaments.

9. An array as claimed in claim 8, including an additional delay line segment connected to said first lamp filament so as to be interposed between said first lamp and said source of firing pulses.

10. An array as claimed in claim 8, in which each of said delay line segments comprises a series inductance and a shunt capacitance.

11. An array as claimed in claim 8, in which the ratio of said characteristic impedance of the delay line segments to said filament resistance is in a range of about 1,000 to 2,000.

* * * * *